(12) United States Patent  
Takase

(10) Patent No.: US 6,282,217 B1  
(45) Date of Patent: Aug. 28, 2001

(54) SOLID-STATE LASER DEVICE

(75) Inventor: Tomohiro Takase, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/253,039

(22) Filed: Feb. 19, 1999

(30) Foreign Application Priority Data

Sep. 4, 1998 (JP) .................................................. 10-251118

(51) Int. Cl.[7] ...................................................... A10S 3/04
(52) U.S. Cl. .................................................. 372/35; 372/34
(58) Field of Search ........................................ 372/35, 34

(56) References Cited

U.S. PATENT DOCUMENTS

| 3,665,337 | * | 5/1972 | Koechner | 372/33 |
| 3,891,945 | * | 6/1975 | Schlossberg et al. | 372/35 |
| 5,272,710 | * | 12/1993 | Sumida et al. | 372/35 |
| 5,311,528 | * | 5/1994 | Fujino | 372/35 |
| 5,774,488 | * | 6/1998 | Kmetec | 372/69 |
| 5,841,805 | * | 11/1998 | Injeyan et al. | 372/69 |
| 5,883,737 | * | 3/1999 | Fujikawa et al. | 359/345 |

FOREIGN PATENT DOCUMENTS

| 40 27 559 | 3/1992 | (DE) . |
| 195 15 635 | 10/1996 | (DE) . |
| 5-21873 | 1/1993 | (JP) . |
| 8-181368 | 7/1996 | (JP) . |

* cited by examiner

Primary Examiner—Frank G. Font  
Assistant Examiner—Delma R. Flores Ruiz  
(74) Attorney, Agent, or Firm—Oblon, Spivak, McClelland, Maier & Neustad, P.C.

(57) ABSTRACT

A laser rod is provided in a first tube through which a cooling medium flows. The laser rod is pumped by a semiconductor laser around and outside the first tube. A laser beam entering from the semiconductor laser into the first tube is diffused by diffusion means before being incident on the laser rod. The diffusion mean is set in a cooling medium in the first tube, so that the laser beam entering into the diffusion means have their reflection component decreased and their refraction component increased.

15 Claims, 4 Drawing Sheets

SOLID-STATE LASER DEVICE

BACKGROUND OF THE INVENTION

The present invention relates to a solid-state laser device for producing laser light by optically pumping a solid-state medium.

In general, a solid-state laser device has a laser rod as a solid-state laser medium and adapted to produce laser light by optically pumping the laser rod. If the laser rod is arranged within an optical resonator, laser light produced from the laser rod is amplified by the optical resonator to produce an oscillation output.

As a pump light source for optically pumping the laser rod, an arc lamp, flash lamp, semiconductor laser, etc., are known and, recently, a semiconductor laser can be often used for outputting pumped light of a given wavelength absorbed in the laser rod. By doing so, it is possible to optically pump the laser rod effectively.

As a high-output semiconductor laser commercially available on the market, use is made of a stacked unit comprised of a plurality of low-output semiconductor lasers mounted as a stack array and each having a small light emitting section. For this reason, such high-output semiconductor laser has a plurality of such light emitting sections and hence an adverse effect is exerted on output beams obtained. If, in particular, in order to enable pumped light of a greater broadening angle from the semiconductor laser to be losslessly incident on the laser rod, a collimating lens is arranged near the light emitting section whereby the broadening angle of the pumped beam is suppressed, then a pattern (light beam) of the pumped lights to be directed toward the laser rod is splitted into a plurality of beams.

Therefore, the laser rod cannot be uniformly pumped with the pumped beam output from the semiconductor lasers, thereby producing a local stress concentration and temperature distribution and hence causing a damage to the laser rod. As a result, laser light from the laser rod has its intensity distribution made not uniform depending upon the pumped state. Further, there arises a local heat lens action, thus leading to a fall in quality of the beam.

In order to avoid such a problem, as shown in FIG. 1, a tube 2 has a laser rod 1 held therein and a cooling medium flown therethrough to cool the laser rod 1 and has a diffusion surface 3 formed on an outer peripheral surface thereof. And the tube 2 is inserted in an insertion hole 5 in a diffusion plate 4 and four tapered light guide passages 6 are formed in the diffusion plate 4 at 90° intervals around the circumference of the tube 2. Beams P pumped from a corresponding semiconductor laser 7 pass through the corresponding light guide path 6.

Therefore, the beams P passing through the light guide passages 6, while being reflected on the inner surface of the light guide passage 6, are incident on a diffusion surface on the outer periphery of the tube 2. The beams, being diffused on the diffusion surface 3, are transmitted through the tube 2 to optically pump the laser rod 1.

According to such a structure, the beams P directed toward the laser rod 1 are diffused on the light guide passage 6 and diffusion surface 3 and it is, therefore, possible to optically pump the laser rod 1 by the beams P from the semiconductor laser.

Since, however, those beams P directed past the light guide passage 6 to the diffusion surface 3 on the tube 2 was liable to be reflected on the diffusion surface 3, a greater loss was involved due to the reflection of the pumped beam P and a fall in pumping efficiency was sometimes encountered. There were sometimes the cases where the diffusion plate 4 produced heat by the beams reflected on the diffusion surface 3 and, in addition, a heat transformation occurred on the diffusion plate 4. In order to prevent such heat transformation it was sometimes necessary to cool the diffusion plate 4.

It has also been considered that, as another means, a diffusion surface is formed on an outer periphery of the laser rod whereby beams are diffused. In this case, since it is not possible to adequately take a diffusion distance of the beams on the diffusion surface, the beams incident on the laser rod are less likely to be diffused, thus failing to uniformly pump the laser rod.

BRIEF SUMMARY OF THE INVENTION

It is accordingly the object of the present invention to provide a solid-state laser device which, even if a diffusion surface is formed on an associated tube, prevents less pumping efficiency.

In one aspect of the present invention, a solid-state laser device, comprising: a first tube of a light transmitting material holding a solid-state laser medium therein and allowing a cooling medium to flow therethrough in order to cool the solid-state laser medium; a semiconductor laser arranged around and outside the first tube to output beam which passes through the first tube and pumps the solid-state laser medium optically; and diffusion means provided in the first tube to diffuse the beam which pump the solid-state laser medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will be explained below with reference to FIGS. 2 to 4.

Figure 1:
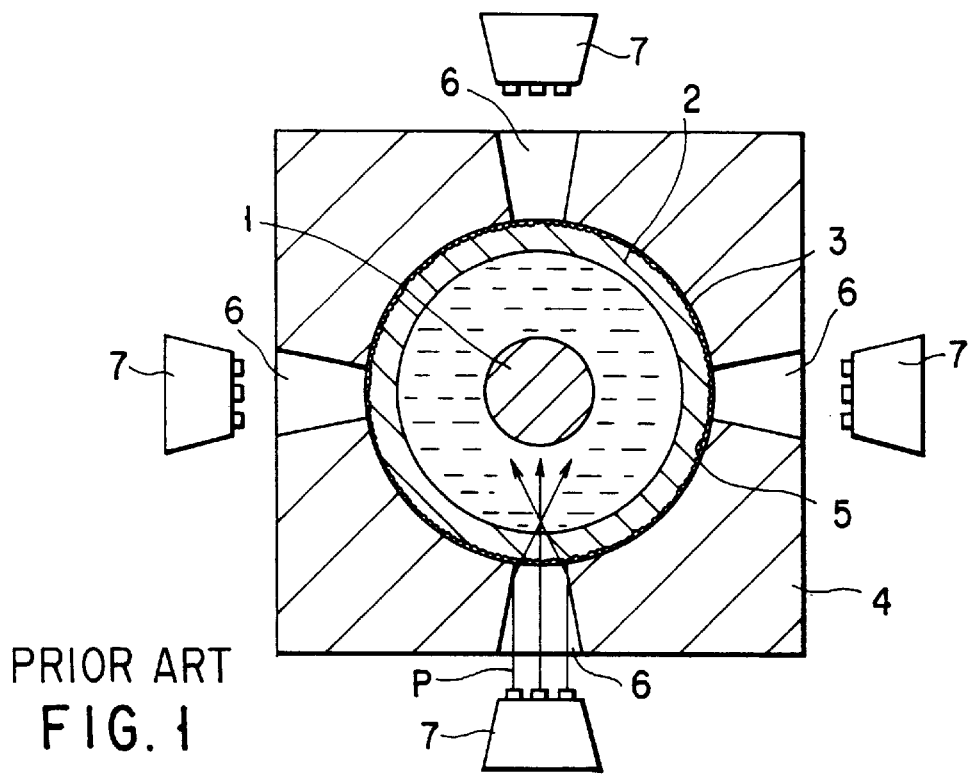
FIG. 1 is a cross-sectional view showing a conventional solid-state laser device.
Figure 2:
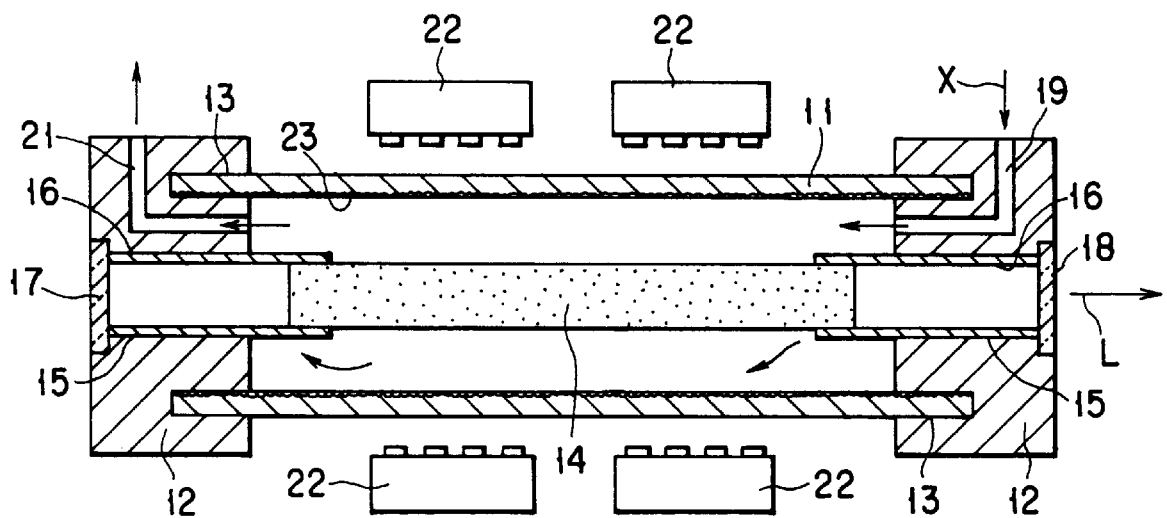
FIG. 2 is a cross-sectional view taken along a light axis direction of a solid-state laser device according to a first embodiment of the present invention.

A solid-state laser device of the present invention has a first tube 11, such as a quartz tube, as shown in FIG. 2. The first tube 11 is liquid-tightly supported by a pair of blocks 12 with one end of the first tube inserted in a retaining groove 13 in the associated block 12 and the other end of the first tube in a retaining groove 13 in the associated block 2.

A laser rod 14 is inserted as a solid-state laser medium within the first tube 11. A pair of retaining short tube 15 are liquid-tightly fitted one over one end of the first tube 11 and one over the other end of the first tube 11. The other end of each of the respective retaining short tubes 15 is liquid-tightly supported in a corresponding through hole 16 in the corresponding block 12 by being inserted in the corresponding through hole 16 in the block 12.

A high reflection mirror 17 is liquid-tightly retained at the one-end side of the retaining short tube 15 to confront one end face of the laser rod 14. An output mirror 18 is liquid-tightly retained in the other-end side of said other short tube 15 to confront the other end face of the laser rod 14. The high reflection mirror 17 and output mirror 18 constitute an optical resonator and, as set out above, laser light L produces an oscillation output from the output mirror by optically pumping the laser rod 14.

In one of the paired blocks 12 a supply passage 19 is formed on one side of the first tube 11 to communicate with an inside of the tube 11, while in the other block a discharge passage 21 is formed on the other side of the tube 11 to communicate with the inside of the tube 11. A cooling medium X, such as pure water, is supplied via the supply passage 19 into the tube 11 to cool the laser rod 14. The cooling medium X supplied into the first tube 11 cools the laser rod and is discharged from the discharge passage 21.

The discharge passage 21 is made smaller in cross-section area than the supply passage 19, so that a flow passage resistance is set to be made greater than that of the supply passage.

Thus, the cooling medium X supplied via the supply passage 19 into the first tube 11 fills the tube 11 and is discharged from the discharge passage 21. That is, the cooling medium X is flowed through the tube 11 such that no air layer is created in the tube 11.

In the case where the solid-state laser device is to be set with an axis of the laser rod 14 horizontal, the discharge passage 21 can be set at substantially the same level as an inner surface of the first tube 11 and the supply passage 19 can be set to be lower than the discharge passage 21 and, thus, the cooling medium can be flowed through the first tube 11 without creating any air layer in the first tube 11.

Figure 3:
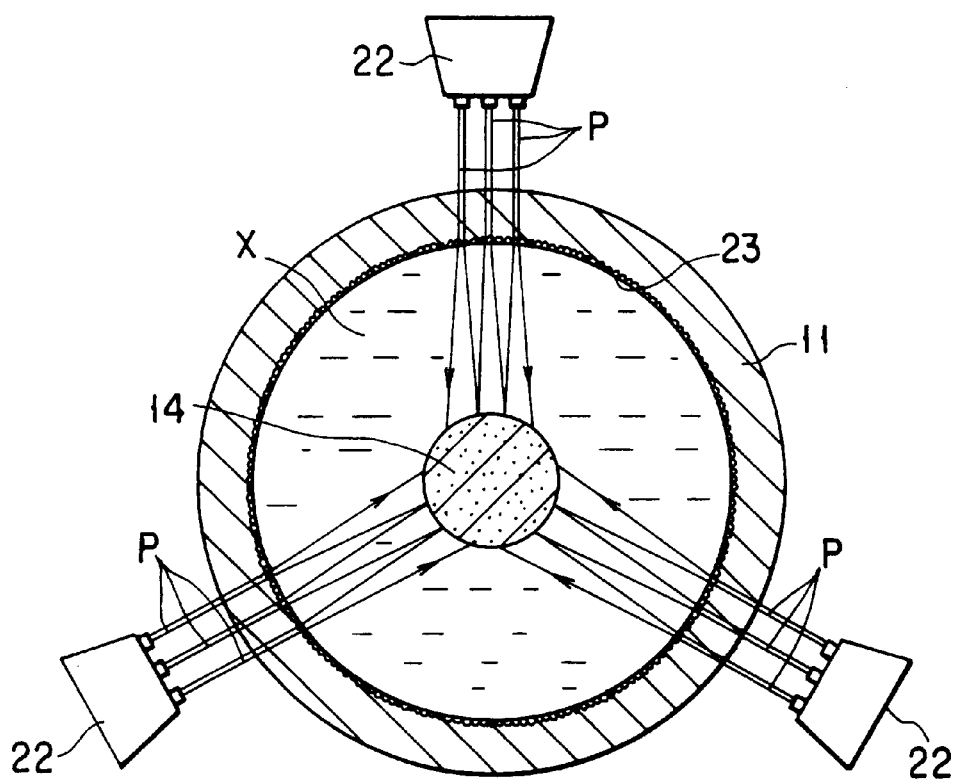
FIG. 3 is an enlarged cross-sectional view taken across in axis direction of a laser rod of a solid-state laser device.

In a plurality of distance positions of an axial direction of the first tube 11, two distance positions in this embodiment, three semiconductor lasers 22 are arranged at 120° intervals around an outer periphery of, and outside a diameter direction of, the first tube 11 as shown in FIG. 3.

Figure 4:
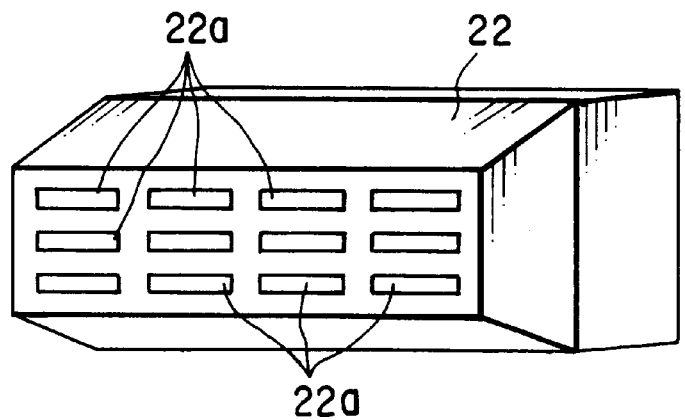
FIG. 4 is a perspective view showing a stack-arrayed semiconductor laser in FIG. 2.

The respective semiconductor lasers 22 are comprised of a stacked structure with a row/column matrix array of low-output light emitting elements 22a arranged as shown in FIG. 4 and, each, produce laser beams from their light emitting elements. A plurality of beams P are incident on an outer peripheral surface of the laser rod 14 past the peripheral wall of the first tube 11, that is, the pumped eight beams P pump the laser rod 14. Even if the semiconductor laser 22 is only one, the semiconductor laser can pump the laser rod 14.

A diffusion surface 23 is formed on an inner surface of the first tube 11 as a means for wholly diffusing the beams P from the semiconductor lasers 22. The diffusion surface 23 is so formed as to have, for example, an uneven surface of the first tube 11.

Thus, the beams P from the semiconductor lasers 22 are diffused on the diffusion surface 23 and are incident on the outer peripheral surface of the laser rod 14 to pump the laser rod 14.

According to the solid-state laser device thus constructed, the beams P output from the semiconductor laser 22 penetrate the circumferential wall of the first tube 11 and, at this time, they are diffused on the diffusion surface 23, that is, on the inner wall surface, of the first tube 11 and are incident on the outer peripheral surface of the laser rod 14. That is, the beams P, being diffused on the diffusion surface 23, illuminate the laser rod 14, so that they uniformly pump the outer peripheral surface of the laser rod 14 from around the inner surface wall of the first tube.

Thus, laser light L whose cross-section is uniform in intensity distribution is output from the laser rod 14 and, through the uniform pumping, it is possible to prevent any local stress concentration and temperature distribution in the cross-section of the laser rod 14 and a resultant damage to the laser rod 14.

Since the diffusion surface 23 is formed on the inner wall surface 23 of the first tube 11, it is in contact with the cooling medium X flowing through the first tube 11. And the beams P from the semiconductor lasers 22, penetrating the peripheral wall of the first tube 11, are diffused on the diffusion surface 23 and optically pump the laser rod 14.

In this case, a reflection component $R_a$ of the pumped beam P is represented by $$R_a = \{(n_1-n_2)/(n_1)+(n_2)\}^2 = \{(1-n_a)/(1+n_a)\}^2$$

That is, in addition to the surface roughness of the diffusion surface 23, $R_a$ is determined by $$n_a = (n_2/n_1)$$

where $n_1$: refractive index (absolute refractive index) of the quartz of which the first tube 11 is formed and $n_2$: refractive index (absolute refractive index) of the cooling medium X.

Therefore, as the ratio $n_a$ becomes nearer to unity, the reflection component is decreased and the refractive component is increased.

If, on the other hand, such a diffusion surface 23 is formed on the outer peripheral surface of the first tube 11 as in a conventional case, a reflection component $R_b$ of the pumped beam P is represented by $$R_b = \{(n_3-n_1)/(n_3+n_1)\}^2 = \{(1-n_b)/(1+n_b)\}^2$$

That is, in addition to the surface roughness of the diffusion surface 23, $R_b$ is determined by a ratio $$n_b(n_1/n_3)$$

where $n_3$: refractive index (absolute refractive index) of the atmosphere in contact with the outer periphery of a first tube 11, and $n_1$: refractive index (absolute refractive index) of a quartz of which the first tube is formed.

Assuming that the surface roughness of the diffusion surface 23 is equal, it follows that in general, the reflection component of the pumped beam P is decreased as a refractive index ratio of mutually contacting two materials becomes nearer to unity and, that is, if the refractive index ratio of these two materials is near to unity, the reflection component at their contact surface is decreased and the refractive component is increased. Here, the ratio $n_a$ between the refractive index $n_1$ of the quartz and that of the cooling medium X is nearer to unity than the ratio nb between the refractive index $n_3$ of the atmosphere and that of the quartz of which the first tube 11 is formed.

That is, if the cooling medium X is pure water, then $n_1=1.4$, $n_2=1.3$ and $n_3=1.0$ and hence $n_a=(1.3/1.4)$ and $n_b=(1.4/1.0)$. Further, the reflectances are, respectively, $R_a=1.372\times10^{-3}$ and $R_b=2.778\times10^{-2}$.

For this reason, the diffusion surface 23 is formed on the inner wall surface of the first tube 11 and the cooling medium X is in contact with the diffusion surface 23, so that the reflection component of the pumped beam P can be decreased in comparison with a conventional case. By doing so, the pumped beam P effectively penetrates the first tube 11 and the light pumping efficiency of the laser rod 14 can be enhanced. Further, the efficiency with which the pumped beam P penetrates the first tube 11 is improved. Since, therefore, the first tube 11 is not heated by the pumped beam P to a more than necessary extent and the first tube 11 is prevented from being damaged by heat involved.

Figure 5:
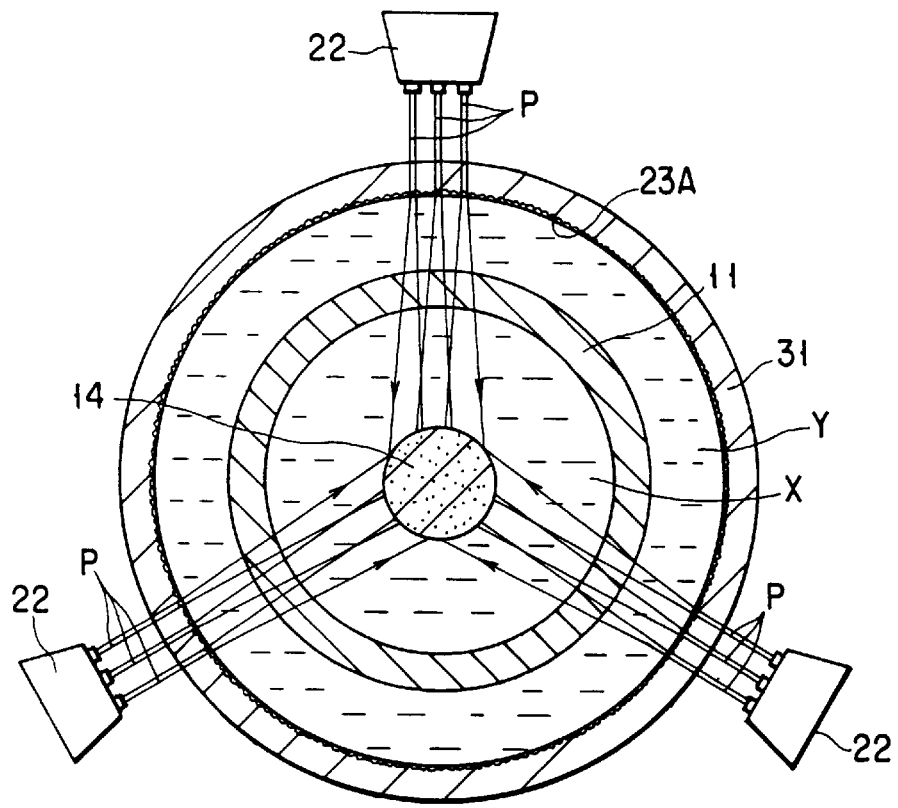
FIG. 5 is a cross-sectional view taken across an axis direction of a laser rod of a solid-state laser device according to a second embodiment of the present invention.

FIG. 5 shows a second embodiment of the present invention. In the second embodiment, the same reference numerals are employed to designate parts or elements corresponding to those shown in the first embodiment and any further explanation is omitted. That is, in the second embodiment, the first tube 11 as shown in the first embodiment is inserted into a second tube 31. The second tube 31 is formed of glass, such as quartz, as in the case of the first tube 11.

Outside the diameter direction of the second tube semiconductor lasers 22 are arranged, for example, at an interval of 120° around the outer periphery of the second tube 31. A liquid Y is filled in a space between an outer peripheral surface of the first tube 11 and an inner wall surface of the second tube 31. The liquid Y is not flowed as in the case of the first tube 11 and is filled in the space between the first tube 11 and the second tube 31 without an air layer being created there.

As the liquid Y use may be made of pure water as in the case of the cooling medium X flowing through the first tube 11, but may be a liquid Y, such as alcohol, differing in refractive index from the pure water.

A diffusion surface 23A is formed on at least any one of an inner wall surface of the first tube 11 in contact with the cooling medium X, an outer periphery surface of the first tube 11 in contact with the liquid Y and an inner wall surface of the second tube 31 in contact with the liquid Y, noting that, in the second embodiment, the diffusion surface 23A is formed on the inner wall surface of the second tube 31.

According to the solid-state device so constructed, beams P from the semiconductor laser 22, being diffused on the diffusion surface 23A on the inner wall surface of the second tube 31, penetrate the peripheral wall of the first tube 11 and then are incident on a laser rod 14 so that the laser rod 14 is optically pumped.

Since the beams P, being diffused on the diffusion surface 23A, are incident on the laser rod 14, the outer peripheral surface of the laser rod 14 is optically pumped in a uniform fashion at predetermined sites in an axial direction of the laser rod 14.

The diffusion surface 23A is in contact with the liquid Y held in the second tube 31. For this reason, the beams P have their reflection components reduced in comparison with the case where the diffusion surface 23A is in contact with the atmosphere and has their refractive components increased, so that the beams effectively penetrate the diffusion surface 23A to cause the laser rod 14 to be optically pumped.

By the refractive index of the liquid Y held in the second tube 31 it is possible to set a broadening angle at which the pumped beam P is incident on the first tube 11. Therefore, it is possible to set a range of illumination by the pumped beam P on the laser rod 14, in particular, a circumferential range, by using a liquid Y of a predetermined refractive index depending upon the distance from an exit face of the semiconductor laser 22 to the outer peripheral surface of the laser rod 14.

Thus by the three semiconductor lasers 22 arranged at an equal interval around and outside the outer peripheral surface of the second tube it is possible to uniformly illuminate the laser rod 14 around a full circumference of the laser rod 14.

Further, a double tube structure adopted comprises the first tube 11 and second tube 31 and, in this case, a cooling medium X is flowed through the first tube 11 only, so that a larger distance is set between the semiconductor laser 22 and the laser rod 14 without increasing an amount of flow of the cooling medium X. By doing so, it is possible to enlarge the beam size of the pumped beam P for illuminating the laser rod 14 and hence to improve the pumping efficiency of the laser rod 14 and its uniform pumping.

In the second embodiment, although the diffusion surface 23A is formed only on the inner wall surface of the second tube 31, it may be formed on the three surfaces, or any two surfaces, of the inner wall surface of the first tube 11, the outer peripheral surface of the first tube 11 and the inner wall surface of the second tube 31.

Needless to say, in the second embodiment, the cooling medium X and liquid Y are filled, respectively, in a space in the first tube 11 and a space between the first tube 11 and the second tube 31 without any air layer being created there.

Figure 6:
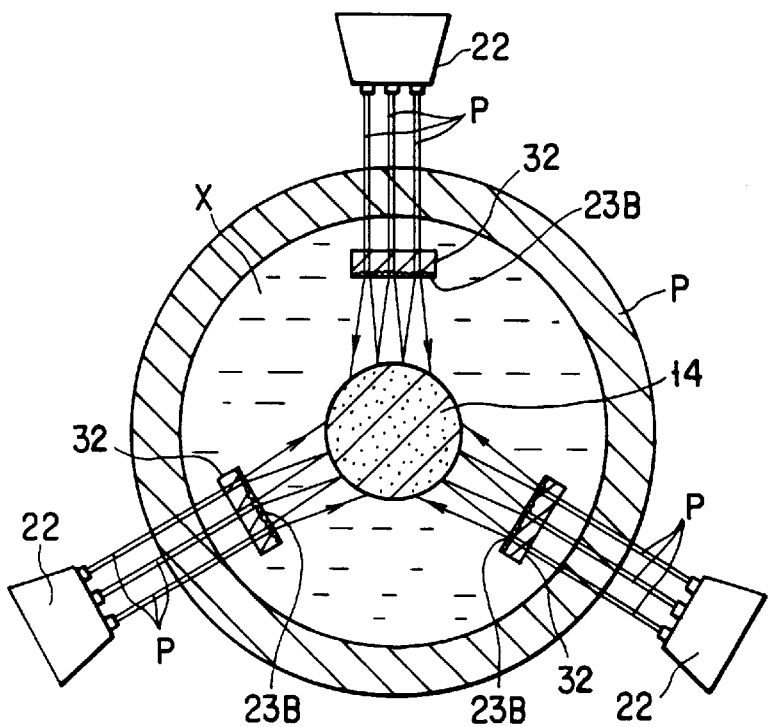
FIG. 6 is a cross-sectional view taken across a light axis direction of a solid-state laser device according to a third embodiment of the present invention.

FIG. 6 shows a third embodiment of the present invention. In the third embodiment, a solid-state laser device is substantially similar in structure to that of the first embodiment except a diffusing means for diffusing beams P.

That is, diffusion members 32 are provided within a first tube 11 such that each diffusion member is set across a corresponding optical path of beams P entering from semiconductor lasers 22 into the first tube 11. The diffusion member 32 is comprised of a band-like member of a specific width dimension with one face, for example, a face confronting a laser rod 14, having a diffusion surface 23B.

The diffusion member 32 is formed of a light transmitting material such as quartz glass and ceramics.

The diffusion members 32 are arranged along an axial direction of the laser rod 14 and their longitudinal opposite end portions, though being not shown, are held by a pair of blocks 12 as in the first embodiment of FIG. 2.

In this arrangement, beams P entering into the first tube 11 from the semiconductor lasers 22 are diffused by the diffusion surfaces 23B of the diffusion members 32 each arranged across the corresponding optical path and then are incident on the laser rod 14.

Since the diffusion members 32 are set in the cooling medium X circulated through the first tube 11, a reflection component of the beams P is decreased at the diffusion surface 23B and their refraction component is increased there.

For this reason, it is possible to enhance the transmission efficiency of the beams P at the diffusion surface 23B, so that there is not temperature rise at the diffusion member 32.

Figure 7:
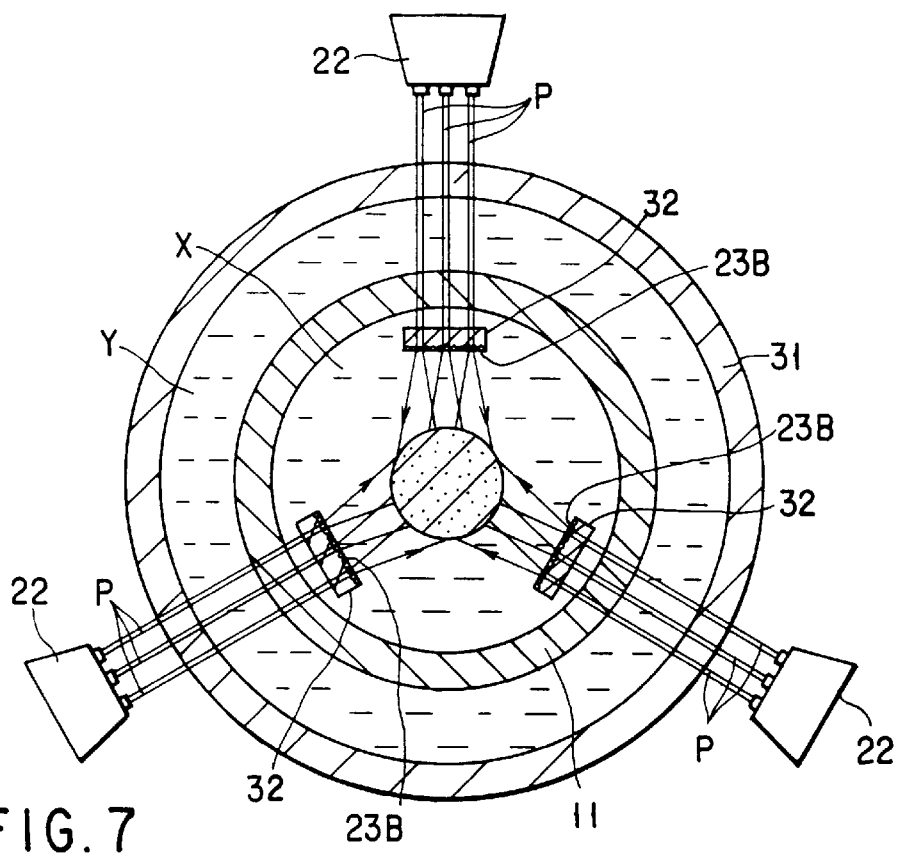
FIG. 7 is a cross-sectional view taken across a light axis direction of a solid-state laser device according to a fourth embodiment of the present invention.

FIG. 7 shows a fourth embodiment of the present invention. In this embodiment, a diffusion means constitutes a variant of the diffusion means in the second embodiment. That is, the diffusion means of this embodiment is of such a type that diffusion members 32 as shown in FIG. 6 are set in the first tube 11.

Figure 8:
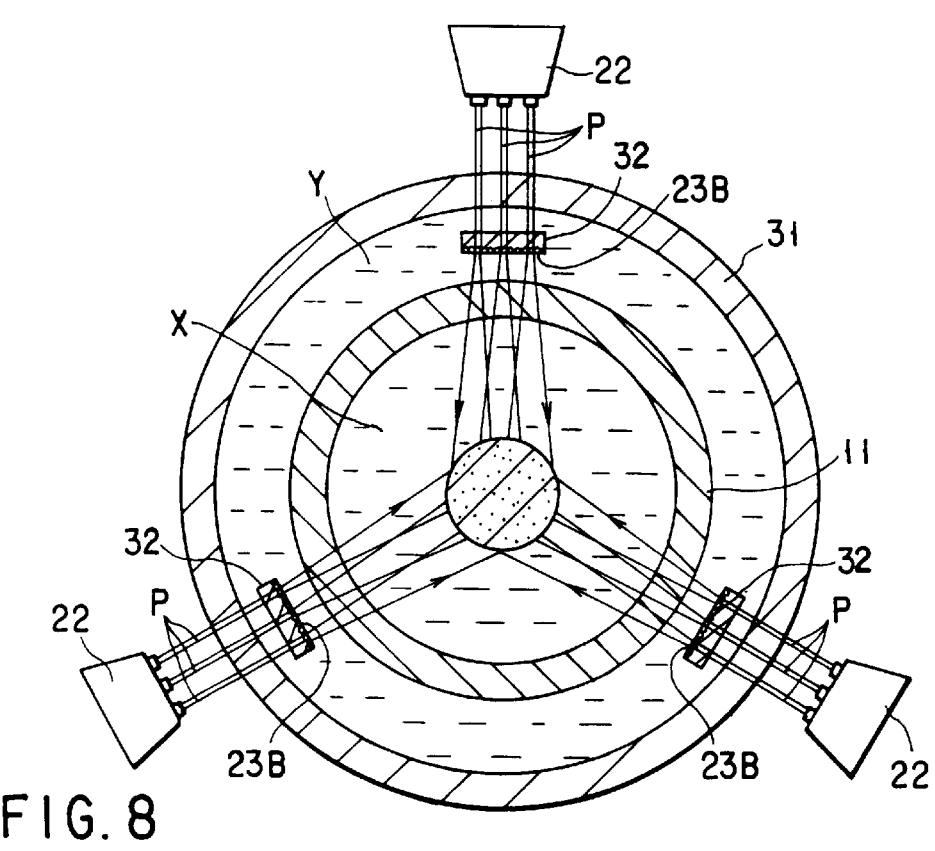
FIG. 8 is a cross-sectional view taken across a light axis direction of a solid-state laser device according to a fifth embodiment.

FIG. 8 constitutes a fifth embodiment of the present invention. This embodiment constitutes a variant of the fourth embodiment and is of such a type that diffusion members 32 are set between a first tube 11 and a second tube 31.

In the fourth and fifth embodiments it is possible to obtain the same advantage as in the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state laser device, comprising:
   a first tube configured to hold a solid-state laser medium and to flow a cooling medium to the solid-state laser medium;
   a second tube configured to hold the first tube, with a liquid filled in a space between an inner wall surface of the second tube and an outer peripheral surface of the first tube;
   a semiconductor laser arranged outside the second tube and configured to output a laser beam which passes through the first and second tubes and which pumps the solid-state laser medium optically; and
   a diffusion mechanism provided in the first tube and configured to diffuse the laser beam to the solid-state laser medium.

2. A solid-state laser device according to claim 1, wherein the diffusion mechanism has a diffusion surface formed on at least one of an inner wall surface of the first tube, an outer peripheral surface of the first tube and an inner wall surface of the second tube and configured to diffuse the laser beam which is directed toward the solid-state laser medium.

3. A solid-state laser device according to claim 1, wherein the cooling medium flowing through the first tube is different in refractive index from a liquid filled in a space between the first tube and the second tube.

4. A solid-state laser device according to claim 1, wherein the diffusion mechanism includes a deflection member of a light transmitting material provided between the first tube and the second tube on an optical path of the laser beam transmitted through the first tube, and said deflection member has a diffusion surface configured to diffuse the laser beam which is transmitted through the first tube.

5. A solid-state laser device according to claim 4, wherein the diffusion mechanism includes a banded member made of a quartz glass or a light transmitting ceramic and is arranged along an axial direction of the solid-state laser medium.

6. A solid-state laser device according to claim 1, wherein the diffusion mechanism includes a diffusion member of a light transmitting material provided between the second tube and the solid-state laser medium on an optical path of the laser beam transmitted through the second tube and each diffusion member has a diffusion surface configured to diffuse the laser beam which is transmitted through the second tube.

7. A solid-state laser device according to claim 6, wherein the diffusion member includes a banded member made of a quartz glass or a light transmitting ceramic and arranged along an axial direction of the solid-state laser medium.

8. A solid-state laser device, comprising:
   a first tube of a light transmitting material configured to hold a solid-state laser medium and to flow a cooling medium to the solid-state laser medium;
   a semiconductor laser arranged outside the first tube and configured to output a laser beam which passes through the first tube and which pumps the solid-state laser medium optically; and
   a diffusion mechanism provided in the first tube and configured to diffuse the laser beam and pump the solid-state laser medium,
   wherein the diffusion mechanism has a diffusion surface formed on an inner wall surface of the first tube and said diffusion surface is configured to diffuse the laser beam which pumps the solid-state laser medium.

9. A solid-state laser device according to claim 8, wherein the cooling medium is a liquid with a refractive index similar to the first tube.

10. A solid-state laser device according to claim 8, wherein the first tube is a quartz glass tube and the cooling medium is water.

11. A solid-state laser device according to claim 8, further comprising:
    a pair of sealed end members provided on opposite end openings of the first tube such that a supply passage is provided in one of the end members to allow the cooling medium to be supplied and a discharge passage is provided on the other end member to allow the cooling medium to be discharged.

12. A solid-state laser device according to claim 11, wherein the discharge and supply passages are configured to flow the cooling medium through the first tube without any air layer being formed in the first tube.

13. A solid-state laser device according to claim 11, wherein the discharge passage is configured to have a flow resistance larger than a flow resistance of the supply passage.

14. A solid-state laser device, comprising:
    a first tube of a light transmitting material configured to hold a solid-state laser medium and to allow a cooling medium to cool the solid-state laser medium;
    a semiconductor laser arranged outside the first tube and configured to output a laser beam which passes through the first tube and which pumps the solid-state laser medium optically; and
    a diffusion mechanism provided in the first tube and configured to diffuse the laser beam and pump the solid-state laser medium, comprising,
    a diffusion member of a light transmitting material set between an inner wall surface and an outer periphery of the solid-state medium,
    wherein said diffusion member includes optical components configured to transmit the laser beam through the first tube and each optical component has a diffusion surface configured to diffuse the laser beam which is transmitted through the first tube.

15. A solid-state laser device according to claim 14, wherein the diffusion member is comprised of a banded member made of a quartz glass or a light transmitting ceramic.

* * * * *